UNITED STATES PATENT OFFICE.

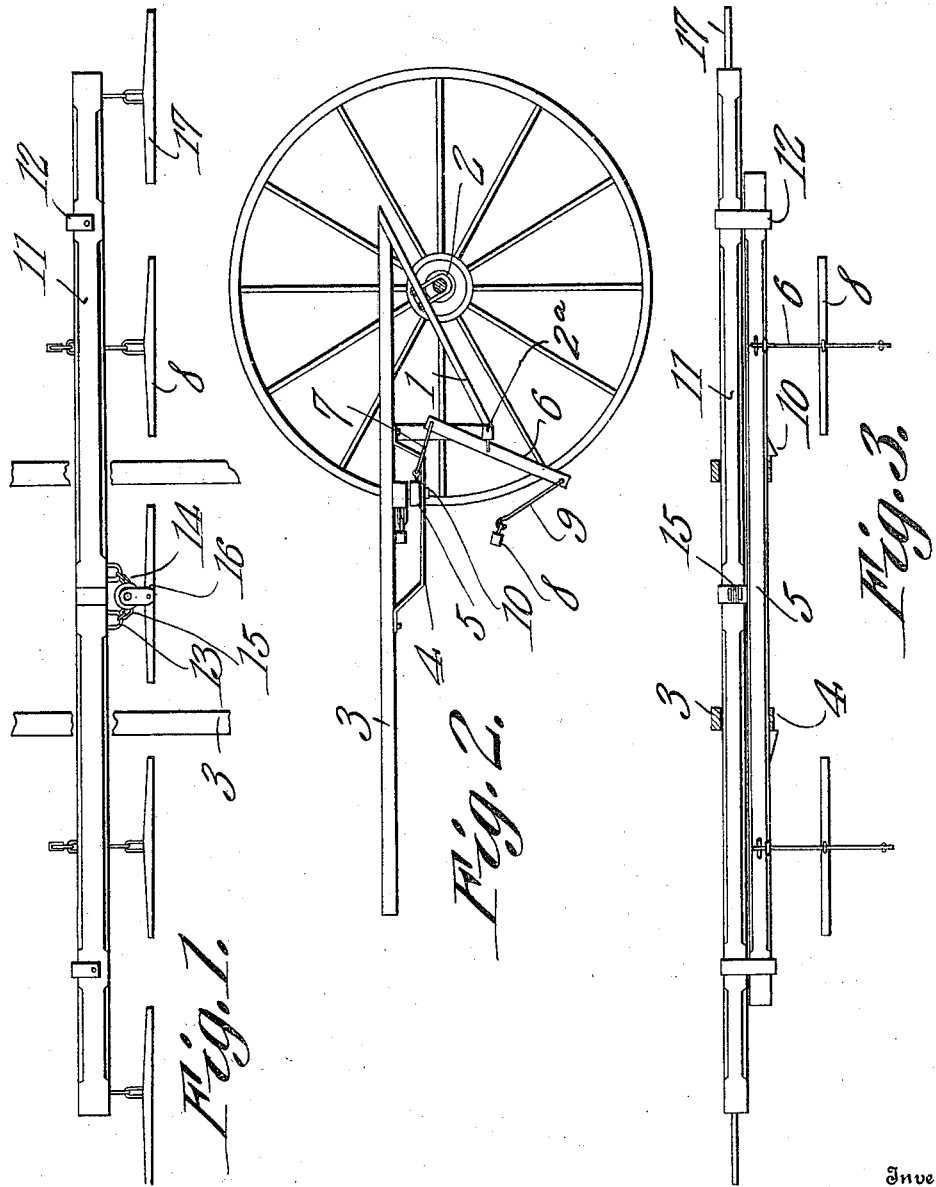

HARLEY O. TURNER, OF LEBANON, KANSAS, ASSIGNOR OF ONE-HALF TO EMIL G. BOCK, OF LEBANON, KANSAS.

DRAFT-EQUALIZER.

965,345.

Specification of Letters Patent. Patented July 26, 1910.

Application filed October 19, 1909. Serial No. 523,425.

*To all whom it may concern:*

Be it known that I, HARLEY O. TURNER, a citizen of the United States, residing at Lebanon, in the county of Smith and State of Kansas, have invented a new and useful Draft-Equalizer, of which the following is a specification.

This invention has relation to draft equalizers and it consists in the novel construction and arrangement of its parts as hereinafter shown and described.

The object of the invention is to provide a simple form of draft equalizer especially adapted to be used for the hitch of five horses abreast and the parts of the equalizer are so arranged as to distribute the strain incident to the pull of the several horses making up the team.

With this object in view the equalizer comprises a frame adapted to be attached to an axle and upon which is mounted a pair of shafts. Guides are carried by the shafts and a draft bar is supported in the said guides transversely of the shafts. Draft levers are fulcrumed upon the opposite end portions of the said draft bar and have greater length extending from their fulcrumed point toward their inner end than from their fulcrumed point toward their outer end. Swingle trees are attached to the outer shorter end of the draft lever and a connecting means is provided at the inner end of the said draft levers and a swingle tree is carried by said connecting means.
Levers are fulcrumed upon the frame and are connected by means of links with the said draft bar and the last said levers also have attached to them swingle trees.

In the accompanying drawings:—Figure 1 is a plan view of a portion of the draft equalizer. Fig. 2 is a side elevation of the same with parts in section. Fig. 3 is a rear elevation of the same with parts in section.

The draft equalizer includes a frame 1 which is mounted upon an axle 2 in any suitable manner and has a cross bar 2ᵃ at the bottom portion of the front thereof, the rear ends of shafts 3 being attached to the said frame 1. The shafts 3 are provided upon their under sides with spaced guides 4 and the said guides are located in advance of the front ends of the frame 1. A draft bar 5 is supported by the guides 4 and lies transversely under the shafts 3. Levers 6 are fulcrumed upon the cross bar 2ᵃ of the frame 1 and their upper ends are connected by means of links 7 with the outer portions (but not the extremities) of the draft bar 5. These levers are adapted to swing in vertical planes. Swingle trees 8 are connected with the lower ends of the levers 6 by means of links 9. Lugs 10 are mounted upon the under side of the draft bar 5 and bear against the outer edges of the guides 4 and are adapted to prevent the said draft bar 5 from having longitudinal movement transversely of the shaft 3 but the said lugs do not interfere with any lateral movement of the said draft bar 5 along the guides 4. Draft levers 11 are fulcrumed at the outer ends of the draft bar 5 and are held in position upon the draft bar 5 by means of clips 12. The inner ends or portions of the levers 5 from the fulcrumed points to the inner extremities are longer than the portions from the fulcrumed points to the outer extremities and will be referred to as the longer end of the lever while the outer portion thereof will be referred to as the shorter end of the lever. The longer portions of the levers lie under shafts 3 above the guides 4 and at their inner end are mounted eyes 13 which are connected together by a flexible member as a chain or a cable 14. A pulley 15 is mounted upon the chain 14 and is connected with a swingle tree 16 which is located between the shafts 3. Swingle trees 17 are mounted at the outer portions of the shorter ends of the draft levers 11. By this arrangement it will be seen that means is provided for hitching five animals abreast and the animals attached to the swingle trees 17 will exercise their pull upon the shorter ends of the draft levers 11 while the single animal connected to the longer end of the said levers is located between the shafts 3. The animals which are hitched to the swingle trees 8 exercise their pull upon the draft equalizer first through the levers 6 then through links 7 to the end portions but not the extremities of the draft bar 5. Thus it will be seen that means is provided for equalizing the strain among the several horses making up the team.

Having described my invention, what I claim as new and desire to secure by Letters Patent is:—

1. The combination with a frame and shafts secured thereto, of guides attached to and extending under the shafts, a draft bar extending transversely of the shafts and slidably mounted on the guides, means upon the bar and lapping the outer edges of the guides for holding the bar against longitudinal movement transversely of the shafts, draft levers fulcrumed upon the bar, a swingle tree, a flexible connection between said swingle tree and the inner or adjoining ends of the draft levers, swingle trees connected to the outer ends of the draft levers, levers fulcrumed upon the frame and mounted to swing in vertical planes, connections between the upper ends of the levers and the draft bar, and swingle trees connected to the lower ends of said levers, the said levers and connections being adapted, during the forward pull on their swingle trees, to shift the draft bar bodily rearwardly along the guides.

2. The combination with a frame and shafts secured thereto, of a draft bar extending transversely of the shafts, guides secured to the shafts, said bar being slidably mounted on the guides, a three horse evener carried by the bar, levers fulcrumed upon the frame and mounted to swing in vertical planes, connections between said levers and the draft bar, and swingle trees connected to the levers for shifting said levers to bodily slide the draft bar rearwardly upon the guides.

In testimony that I claim the foregoing as my own, I have hereto affixed my signature in the presence of two witnesses.

HARLEY O. TURNER.

Witnesses:
CHAS. LOEKE,
E. C. ELDRED.